(12) United States Patent
Tashiro et al.

(10) Patent No.: US 11,455,660 B2
(45) Date of Patent: Sep. 27, 2022

(54) EXTRACTION DEVICE, EXTRACTION METHOD, AND NON-TRANSITORY COMPUTER READABLE STORAGE MEDIUM

(71) Applicant: YAHOO JAPAN CORPORATION, Tokyo (JP)

(72) Inventors: Takashi Tashiro, Tokyo (JP); Shumpei Okura, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 991 days.

(21) Appl. No.: 14/816,737

(22) Filed: Aug. 3, 2015

(65) Prior Publication Data
US 2016/0042403 A1 Feb. 11, 2016

(30) Foreign Application Priority Data
Aug. 8, 2014 (JP) .............................. JP2014-163226

(51) Int. Cl.
*G06Q 30/02* (2012.01)
*G06Q 10/06* (2012.01)

(52) U.S. Cl.
CPC ....... *G06Q 30/0269* (2013.01); *G06Q 10/067* (2013.01)

(58) Field of Classification Search
CPC .................................................. G06Q 30/0255
See application file for complete search history.

(56) References Cited

U.S. PATENT DOCUMENTS

| | | | |
|---|---|---|---|
| 8,751,418 B1 * | 6/2014 | Sutter | G06Q 30/0255 706/12 |
| 2003/0101449 A1 * | 5/2003 | Bentolila | G06Q 30/0251 725/10 |
| 2004/0024682 A1 * | 2/2004 | Popovitch | G06Q 40/04 705/37 |

(Continued)

FOREIGN PATENT DOCUMENTS

| | | |
|---|---|---|
| JP | 2011-108094 A | 6/2011 |
| JP | 2012-094097 A | 5/2012 |

OTHER PUBLICATIONS

"Why Do Developers Find It Hard to Learn Machine Learning?" Janakiram MSV. Forbes, Jan. 1, 2018. Retrieved from the Internet: <https://www.forbes.com/sites/janakirammsv/2018/01/01/why-do-developers-find-it-hard-to-learn-machine-learning/#394443556bf6> on Apr. 10, 2019.*

(Continued)

*Primary Examiner* — Jamie R Kucab
(74) *Attorney, Agent, or Firm* — Oliff PLC

(57) ABSTRACT

The extraction device according to the present application includes an acquisition unit and an extraction unit. The acquisition unit acquires behavior histories of users being candidates to whom content is to be distributed. The extraction unit extracts target users expected to perform specified behavior, based on a behavior history designated by a content provider, of the behavior histories acquired by the acquisition unit. For example, the extraction unit uses a model for determining the degree of similarity between a user performing the specified behavior and a target user expected to perform specified behavior based on the behavior history designated by the content provider in order to extract the target users.

7 Claims, 8 Drawing Sheets

(56) References Cited

U.S. PATENT DOCUMENTS

| | | | | |
|---|---|---|---|---|
| 2009/0132347 A1* | 5/2009 | Anderson | | G06Q 30/02 |
| | | | | 705/14.52 |
| 2009/0248496 A1* | 10/2009 | Hueter | | G06Q 10/00 |
| | | | | 705/7.29 |
| 2010/0153187 A1* | 6/2010 | Ghani | | G06Q 30/02 |
| | | | | 705/14.53 |
| 2011/0035222 A1* | 2/2011 | Schiller | | G10L 13/00 |
| | | | | 704/260 |
| 2011/0231256 A1* | 9/2011 | Wang | | G06Q 30/02 |
| | | | | 705/14.53 |
| 2011/0231257 A1* | 9/2011 | Winters | | G06Q 30/0255 |
| | | | | 705/14.53 |
| 2012/0066064 A1* | 3/2012 | Yoder | | G06Q 30/00 |
| | | | | 705/14.53 |
| 2013/0325608 A1* | 12/2013 | Kulkarni | | G06Q 30/0255 |
| | | | | 705/14.53 |
| 2014/0075428 A1* | 3/2014 | Van Elsas | | G06F 8/61 |
| | | | | 717/174 |
| 2014/0130093 A1* | 5/2014 | Goergen | | H04N 7/17318 |
| | | | | 725/40 |
| 2014/0172560 A1* | 6/2014 | Satyavolu | | H04M 15/805 |
| | | | | 705/14.53 |
| 2015/0006286 A1* | 1/2015 | Liu | | G06Q 50/01 |
| | | | | 705/14.53 |
| 2015/0187201 A1* | 7/2015 | Yuksel | | H04L 51/24 |
| | | | | 340/539.13 |
| 2015/0317651 A1* | 11/2015 | Barker | | G06Q 30/02 |
| | | | | 705/7.33 |
| 2015/0339754 A1* | 11/2015 | Bloem | | G06F 17/30867 |
| | | | | 705/26.7 |
| 2016/0005002 A1* | 1/2016 | Azose | | G06Q 10/02 |
| | | | | 705/7.18 |
| 2017/0150225 A1* | 5/2017 | Trollope | | H04N 21/44008 |
| 2017/0201803 A1* | 7/2017 | Wald | | H04N 21/4882 |

OTHER PUBLICATIONS

"Why is machine learning 'hard'?" Enam, S. Zayd. Stanford, Nov. 10, 2016. Retrieved from the Internet: <http://ai.stanford.edu/~zayd/why-is-machine-learning-hard.html> on Apr. 10, 2019.*

May 24, 2016 Office Action issued in Japanese Patent Application No. 2014-163226.

* cited by examiner

| USER ID | ATTRIBUTE INFORMATION | | | ... | ... |
| --- | --- | --- | --- | --- | --- |
| | GENDER | ADDRESS | AGE | | |
| ... | ... | ... | ... | ... | ... |
| U11 | MALE | TOKYO | 30'S | ... | ... |
| U12 | FEMALE | TOKYO | 40'S | ... | ... |
| ... | ... | ... | ... | ... | ... |
| U21 | FEMALE | OSAKA | 20'S | ... | ... |
| U22 | MALE | TOKYO | 20'S | ... | ... |
| ... | ... | ... | ... | ... | ... |

EXTRACTION DEVICE, EXTRACTION METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-163226 filed in Japan on Aug. 8, 2014.

BACKGROUND OF THE INVENTION

1. Field of the Invention

The present invention relates to an extraction device, an extraction method, and a non-transitory computer readable storage medium having stored therein an extraction program.

2. Description of the Related Art

In recent years, with the rapid spread of the Internet, advertisement distribution through the Internet has been frequently performed. In such advertisement distribution, for increasing advertising effectiveness, targeted distribution is performed. In targeted distribution, user information such as user's preferences, gender, age, address, or occupation is registered in advance, and an advertisement is selectively distributed based on the user information.

Further, for targeted distribution, a technology is known in which a group of users with similar web browsing habits as an advertising target is identified. Then, advertisement is distributed to the identified group of users as well, and the audience to whom advertisement is to be distributed is increased.

However, in the above related art, advertising effectiveness is not always increased. Specifically, the related art designates (as similar users) web browsing users similar to users to whom advertisement is to be distributed. However, it is difficult to quantify a degree of similarity between users only based on users' web browsing history, and it is hard to ensure that similar users are accurately identified. When the users are not identified accurately, advertisement is distributed to users not interested in the advertisement, and the distributed advertisement is not fully effective.

SUMMARY OF THE INVENTION

It is an object of the present invention to at least partially solve the problems in the conventional technology.

An extraction device according to the present application includes an acquisition unit configured to acquire behavior histories of users being candidates to whom content is to be distributed, and an extraction unit configured to extract target users expected to perform specified behavior, based on a behavior history designated by a content provider who provides the content, of the behavior histories acquired by the acquisition unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of an attribute information storage unit according to an embodiment;

DETAILED DESCRIPTION OF THE PREFERRED EMBODIMENTS

Modes for carrying out an extraction device, an extraction method, and a non-transitory computer readable storage medium having stored therein an extraction program according to the present application (hereinafter, referred to as "embodiment") will be described in detail below with reference to the drawings. It should be understood that the extraction device, the extraction method, and the non-transitory computer readable storage medium having stored therein an extraction program according to the present application will not be limited by the embodiments. Further, the embodiments may be appropriately combined with each other. Further, in the following embodiments, the same portions are denoted by the same reference signs, and repeated description thereof will be omitted.

1. Summary of Extraction Process

Figure 1:
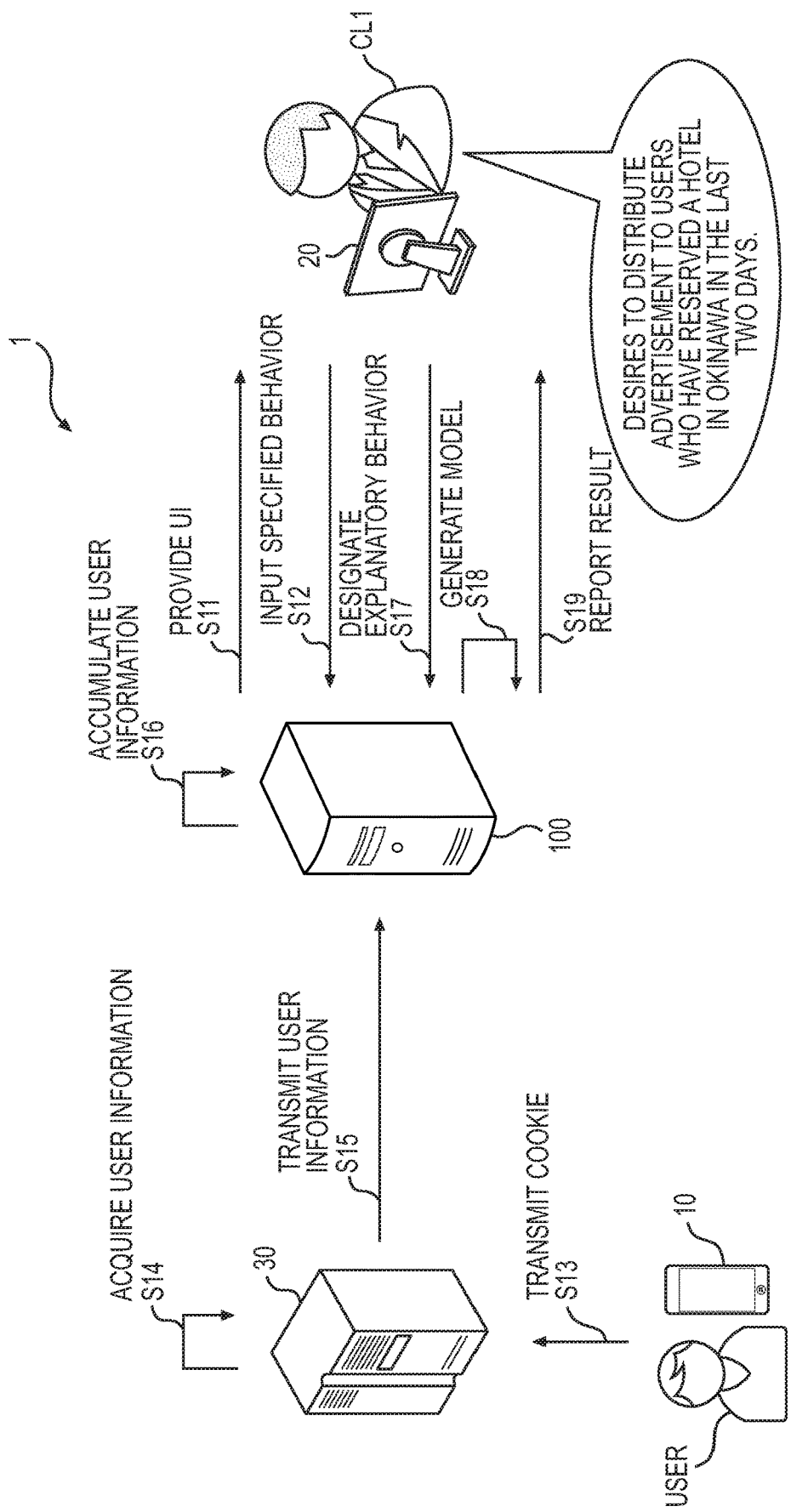
FIG. 1 is a diagram illustrating an example of an extraction process according to an embodiment.

First, using FIG. 1, an example of an extraction process according to an embodiment will be described. FIG. 1 is a diagram illustrating the example of the extraction process according to an embodiment. FIG. 1 illustrates the example in which a user extraction process is performed by an extraction system 1 including an extraction device 100 according to the present application.

As illustrated in FIG. 1, the extraction system 1 includes a user terminal 10, an advertiser terminal 20, a web server 30, and the extraction device 100. The extraction device 100 is communicably connected to the user terminal 10, the advertiser terminal 20, and the web server 30 through a network N (e.g., the Internet), not illustrated. It is noted that the number of the user terminals 10, the advertiser terminals 20, or the web servers 30 included in the extraction system 1 is not limited to that exemplified in FIG. 1. For example, the extraction system 1 may include two or more user terminals 10.

The user terminal 10 represents an information processing device such as a desktop personal computer (PC), a notebook PC, a tablet terminal, a mobile phone, or a personal digital assistant (PDA). For example, the user terminal 10 accesses the web server 30 to obtain a web page from a website provided by the web server 30, and displays the obtained web page on a display device (e.g., liquid crystal display).

The advertiser terminal 20 represents an information processing device used by an advertiser. In an example illustrated in FIG. 1, the advertiser terminal 20 transmits criteria for user extraction to the extraction device 100, or receives information about users from the extraction device 100, according to the operation of the advertiser CL1.

It is noted that the advertiser CL1 may request an agency to perform such processing, using the advertiser terminal 20, without transmitting, by him-/her-self, the criteria for user extraction to the extraction device 100, or without receiving the information about users from the extraction device 100. In this case, the agency instead performs the processing of the extraction device 100. Hereinafter, description such as the "advertiser" represents a concept including the agency in addition to the advertiser, and description such as the "advertiser terminal" represents a concept including an agency terminal used by the agency in addition to the advertiser terminal 20.

The user terminal 10 is a server apparatus for providing various web pages from the web server 30. The web server 30 provides various web pages of, for example, a news site, an auction site, a weather forecast site, a shopping site, a finance (stock price) site, a route-finding site, a map providing site, a travel site, a restaurant listing site, or a web blog.

It is noted that, in order to distribute the web page, the web server 30 identifies the user terminal 10, and designates the user terminal 10 to which the web page is distributed. Identification of the user can be performed, for example, by adding user identification information to a hypertext transfer protocol cookie (HTTP cookie: hereinafter, simply referred to as "cookie") exchanged between a browser of the user terminal 10 and the web server 30.

The extraction device 100 represents a server apparatus for extracting users having a high possibility of performing specified behavior in the future, based on the information about users. The extraction device 100 provides the extracted information about users to the advertiser terminal 20.

That is, the extraction device 100 uses user information to extract users for whom advertising content is assumed to be more effective, and provides information about the extracted users to the advertiser. The advertiser (e.g., company managing a hotel, travel agency, or the like) requesting advertisement distribution uses the extraction device 100 to get advertisement distribution with a high probability of getting results from the distribution target, that is, advertisement distribution having high advertising effectiveness. It is noted that the user information includes log data (i.e., user behavior history) upon access to a website by the user terminal 10 operated by a general user (including transmission of information representing click of a banner advertisement on a web page, or transmission of a request for merchandise purchase), or attribute information of the user him-/her-self (e.g., user's age, gender, preferences) derived from a website access history, purchase history, or the like.

In the example of FIG. 1, the extraction device 100 according to an embodiment extracts users having a high possibility of performing "specified behavior" in the future. The advertiser distributes advertising content to the extracted user to improve a conversion rate of the advertising content. Conversion means an end result obtained by the advertiser through the distribution of advertising content, or a user's action leading to advertiser's profit. An example of the conversion includes action of purchasing merchandise, making a subscription, requesting information materials, or making inquiries about merchandise or the like, on a web page. In other words, the "specified behavior" means the user's action, and represents an action leading to the conversion. In FIG. 1, as an example of the extraction process according to an embodiment performed by the extraction device 100, users having a high possibility of performing specified behavior of "reserving a hotel in Okinawa in the last two days" will be described.

In the example of FIG. 1, the extraction device 100 performs the process of extracting users suitable for a purpose of the advertiser CL1 according to a request from the advertiser CL1 using the user information for the advertisement distribution. First, the extraction device 100 provides a user interface (hereinafter, may be referred to as "UI") to the advertiser CL1, for exchange of information with the advertiser CL1 (step S11). The UI is, for example, a screen displayed on the advertiser terminal 20, and is provided for the advertiser as a screen for receiving input from the advertiser terminal 20.

The advertiser CL1 inputs, to the UI, criteria about the users to whom the advertiser desires to distribute an advertisement, through the advertiser terminal 20. First, the advertiser CL1 inputs the specified behavior of the users to whom the advertiser desires to distribute an advertisement (step S12). Specifically, the advertiser CL1, a company managing a hotel in Okinawa inputs the specified behavior of "reserving a hotel in Okinawa in the last two days". In other words, the advertiser CL1 inputs details of a conversion that is assumed will result from advertisement distribution.

Then, the extraction device 100 acquires the user information of users performing specified behavior, for generation of a model described below. Specifically, the extraction device 100 acquires behavior histories or the like obtained when the user terminals 10 access the web server 30.

Here, it is assumed that the web server 30 acquires the user information from the user terminals 10. In other words, in the example illustrated in FIG. 1, the user terminal 10 accesses the web server 30 to acquire a web page provided by the web server 30. Upon access to the web server 30, the user terminal 10 transmits the cookie to the web server 30 (step S13).

Then, the web server 30 acquires, as access information of the user terminal 10 to a website, the user information including a website browsing history, a merchandise purchase history, a behavior history such as past search queries, based on the transmitted cookie (step S14). Further, the web server 30 identifies the user operating the user terminal 10, based on the transmitted cookie. Then, when the cookie includes the attribute information of the user, the web server 30 acquires the attribute information of the user, based on the transmitted cookie.

Next, the web server 30 transmits the user information to the extraction device 100 (step S15). The web server 30 may transmit the user information to the extraction device 100 upon acquisition of the user information, or may transmit the user information upon responding to a request relating to acquisition of the user information, received from the extraction device 100.

Therefore, the extraction device 100 acquires the user information of the user terminal 10 accessing the web server 30. Then, the extraction device 100 accumulates the acquired user information (step S16). It is noted that the extraction device 100 accumulates user behavior information or attribute information to be determined for each user, based on a user ID as information for identification of the user. As described above, the extraction device 100 accumulates the behavior history relating to the "specified behavior" input by the advertiser CL1.

Here, it is assumed that the extraction device 100 acquires behavior histories of users performing specified behavior for a predetermined period or a predetermined number of the behavior histories of users performing specified behavior, and a sufficient number of behavior histories are accumulated to generate the model. Next, the extraction device 100 further receives the input of criteria of the extraction process from the advertiser CL1. Specifically, the advertiser CL1 designates, on the UI, an "explanatory behavior" for users assumed to have the specified behavior (step S17).

Here, the "explanatory behavior" represents an action that is an assumed cause of the specified behavior of the user. In other words, the "explanatory behavior" represents a behavior accounting for motivation to perform the specified behavior of the user. For example, the advertiser CL1 designates action of "searching for information about scuba diving", as explanatory behavior accounting for the specified behavior of "reserving a hotel in Okinawa in the last two days". In this case, it can be said that the advertiser CL1 expresses knowledge that a user reserving a hotel in Okinawa is often interested in the information about scuba diving, based on a rule of thumb, using the "explanation behavior". It is noted that, hereinafter, the specified behavior may be referred to as "specific behavior". Further, the explanatory behavior may be referred to as "explanation behavior".

As described above, upon receiving the designation of the explanation behavior from the advertiser CL1, the extraction device 100 can perform the extraction process including the knowledge of the advertiser CL1. That is, the extraction device 100 generates a behavior model for users expected to perform specified behavior, based on the explanation behavior designated by the advertiser CL1 and the accumulated user information. The extraction device 100 calculates a similarity between the generated model and users to be extracted, and extracts users having a high possibility of performing specified behavior in the future. A description will be made below on this point.

First, prior to a description of a model generation process according to an embodiment, a user extraction method (hereinafter, referred to as "assumption method") will be described, which is assumed to be used for so-called targeted advertisement or the like. The assumption method includes setting a category of users to whom an advertisement is desired to be distributed, based on the behavior histories of users. Here, in marketing, the category represents a group of users categorized according to a predetermined attribute. For example, the assumption method includes setting the category of the users by designating the criteria. Example criteria are "users having a behavior history for a predetermined period before a present time, including browsing a web page relating to reservation of a hotel in Okinawa not less than once and searching for information about a hotel in Okinawa not less than three times." The criteria in the assumption method are automatically selected from, for example, behavior histories relatively frequently stored in past behavior histories of the users performing specified behavior. The assumption method includes distributing advertising content (assumed to appeal to such users) to the users included in the set category. As described above, the assumption method includes categorizing the targeted users based on the past behavior history, so that advertisement can be distributed to users for whom advertising content is assumed to have increased effectiveness. It is noted that, in the assumption method, not only a similar action between users, but also similar attribute information may be employed.

However, in the assumption method, problems may occur when the number of target users is increased. For example, it is assumed that the users are categorized, and advertising content is distributed to the categorized users. When the number of users to whom the advertising content is to be distributed is smaller than the number of items of advertising content to be distributed which is desired by the advertiser, the number of users to whom the advertising content is to be distributed should be increased. Therefore, in the assumption method, the users to whom the advertising content is to be distributed is changed, for example, from the "users having a behavior history for a period from a present time to a predetermined time, including browsing a web page relating to reservation of a hotel in Okinawa not less than once and searching for information about a hotel in Okinawa not less than three times" to "users having behavior history including browsing a web page relating to reservation of a hotel in Okinawa not less than once, and searching for information about a hotel in Okinawa not less than once." As described above, when the criteria about the user is changed, the number of users extracted is increased, but the similarity between an original category and users extracted under new criteria is reduced. Therefore, in the assumption method, advertisement is distributed even to users assumed to be less likely to reach a conversion.

Further, in the assumption method, a model generator sometimes cannot determine an action of a past behavior history of a user, e.g. "searching for information about scuba diving" as an action leading to the specified behavior, e.g. "reserving a hotel in Okinawa in the last two days." For example, when the number of users taking an action of "searching for information about scuba diving" is relatively smaller than the number of users taking an action of "reserving a hotel in Okinawa in the last two days," the action of "searching for information about scuba diving" may be determined as an action unrelated to the specified behavior. In this case, the action of "searching for information about scuba diving" is not determined as an important action leading to the specified behavior. Therefore, the users having a behavior history of "searching for information about scuba diving" are sometimes not extracted as users having a high possibility to reach a conversion.

On the other hand, the advertiser knows that a relatively large number of customers are interested in scuba diving, among all customers reserving his/her hotel. For example, the advertiser knows that even if customers do not have searching behavior on a network N, the customers often stay at his/her hotel for scuba diving. However, as described above, in the assumption method, since a degree of similarity is determined based on the past behavior histories of users, such knowledge of the advertiser is not included as an index for determination for the extraction process.

Therefore, the extraction device 100 according to an embodiment adopts such knowledge of the advertiser, and generates a user behavior prediction model. That is, the extraction device 100 receives from the advertiser the designation of the "explanation behavior" being a behavior accounting for the specific behavior on the provided UI. Then, the extraction device 100 generates a model based on the received explanation behavior. For example, the extraction device 100 generates the model for determining a user having a behavior history including the explanation behavior to have a high degree of similarity with the model. Therefore, the knowledge of the advertiser is reflected in the model generated by the extraction device 100.

That is, the extraction device 100 generates a model for extracting users, based on the content designated on the UI from the advertiser CL1 (step S18). The extraction device 100 determines the degree of similarity between the generated model, and the behavior history of a user to be extracted. Then, the extraction device 100 extracts users having a degree of similarity not less than a predetermined threshold. The extraction device 100 reports a result of the extraction process using the generated model, to the advertiser CL1 (step S19). Specifically, the extraction device 100 provides an extraction result to the advertiser CL1 by displaying on the UI the number of users extracted. After that, when the advertiser CL1 distributes the advertisement to the extracted users, the advertiser CL1 makes an advertisement distribution request to a predetermined advertisement distribution server.

As described above, the extraction device 100 according to an embodiment acquires the behavior histories of users being candidates to whom advertising content is to be distributed. Then the extraction device 100 according to an embodiment extracts target users expected to perform specified behavior, based on a behavior history designated by the advertiser from among the obtained behavior histories.

That is, the extraction device 100 according to an embodiment extracts users expected to perform specified behavior in the future similarly to users actually performing specified behavior, based on actual behavior histories of the users to be extracted, and the explanation behavior designated by the advertiser. In other words, the extraction device 100 generates the model by adopting not only similar behavior or similar attributes between users mechanically derived from the past user information, but also knowledge of the advertiser. Therefore, the extraction device 100 can highly accurately extract the users having a high possibility to reach a conversion, e.g., reserving a hotel in Okinawa. Further, according to the extraction device 100, domain knowledge of the advertiser can be effectively used. Further, the extraction device 100 can extract a larger number of users determined to have a high degree of similarity relative to those extracted by the assumption method, using the model including the knowledge of the advertiser. Therefore, the extraction device 100 can show, for the advertiser, a larger number of users to whom advertisement is to be distributed. Accordingly, the extraction device 100 can accurately increase the number of users considered as a market by the advertiser. The advertiser can distribute the advertising content to the users extracted by the extraction device 100 to increase the effectiveness of the advertising content.

2. Configuration of Extraction Device

Figure 2:
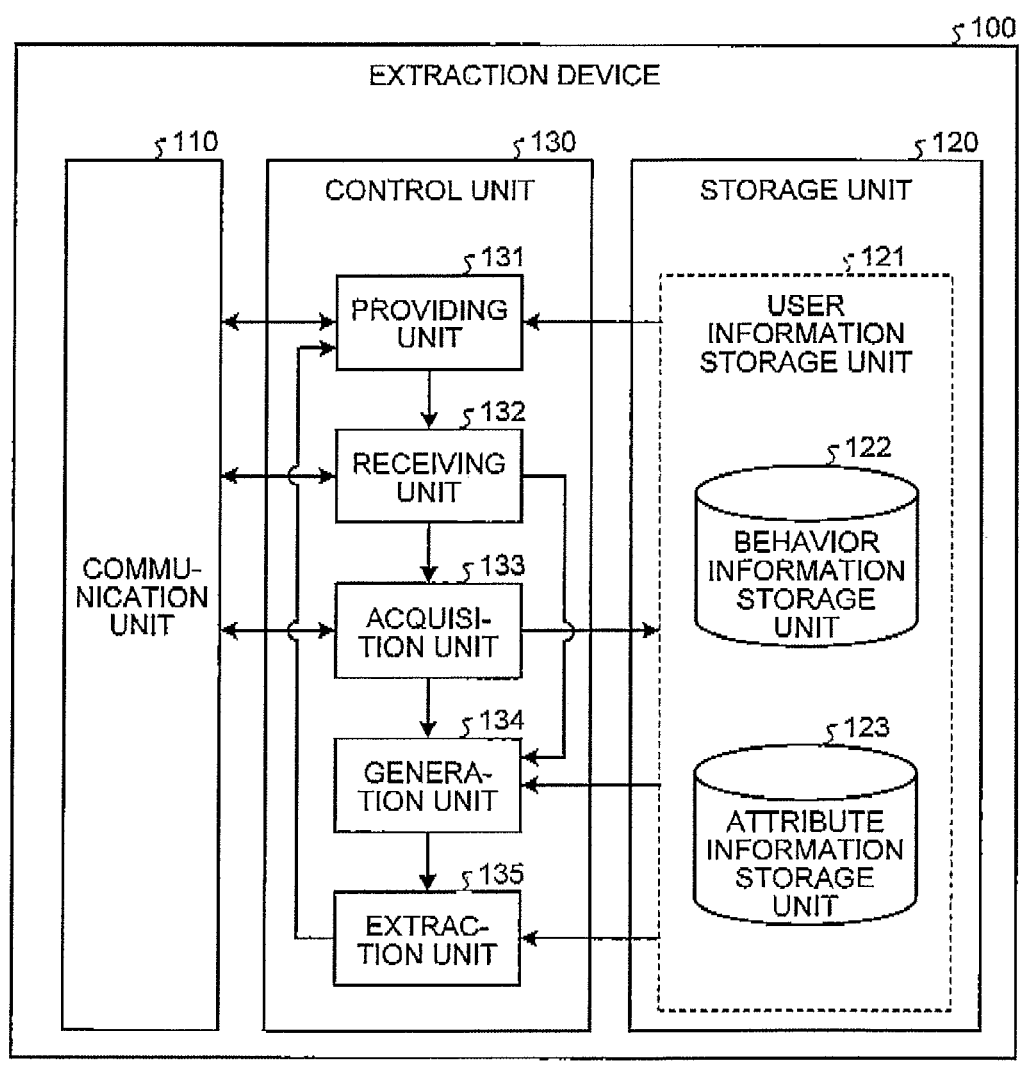
FIG. 2 is a diagram illustrating an exemplary configuration of an extraction device according to an embodiment.

Next, using FIG. 2, a configuration of the extraction device 100 according to an embodiment will be described. FIG. 2 is a diagram illustrating an exemplary configuration of the extraction device 100 according to an embodiment. As illustrated in FIG. 2, the extraction device 100 includes a communication unit 110, a storage unit 120, and a control unit 130. It is noted that the extraction device 100 may include an input unit (e.g., keyboard, mouse, or the like) configured to receive various operations of an administrator or the like using the extraction device 100, and a display unit (e.g., liquid crystal display) configured to display various information.
(About Communication Unit 110)

The communication unit 110 includes, for example, a network interface card (NIC) or the like. Such a communication unit 110 is wiredly or wirelessly connected to the network N, and performs transmission and reception of information with the user terminal 10, the advertiser terminal 20 and the web server 30, through the network N.
(About Storage Unit 120)

The storage unit 120 includes, for example, a semiconductor memory element such as a random access memory (RAM) or a flash memory, or a storage device such as a hard disk or an optical disk. As illustrated in FIG. 2, the storage unit 120 includes a user information storage unit 121.
(About User Information Storage Unit 121)

The user information storage unit 121 stores the user information acquired by the extraction device 100. Specifically, the user information storage unit 121 stores information including a user action log, the attribute information of the user, or the like. The information including a user action log is created upon access of the user terminal 10 to the web server 30, input of the search query in a search page provided by the web server 30, or transmission of a purchase request for a product. The user information storage unit 121 includes a behavior information storage unit 122 configured to mainly store the user behavior information, and an attribute information storage unit 123 configured to mainly store the attribute information of the user.
(About Behavior Information Storage Unit 122)

Figure 3:
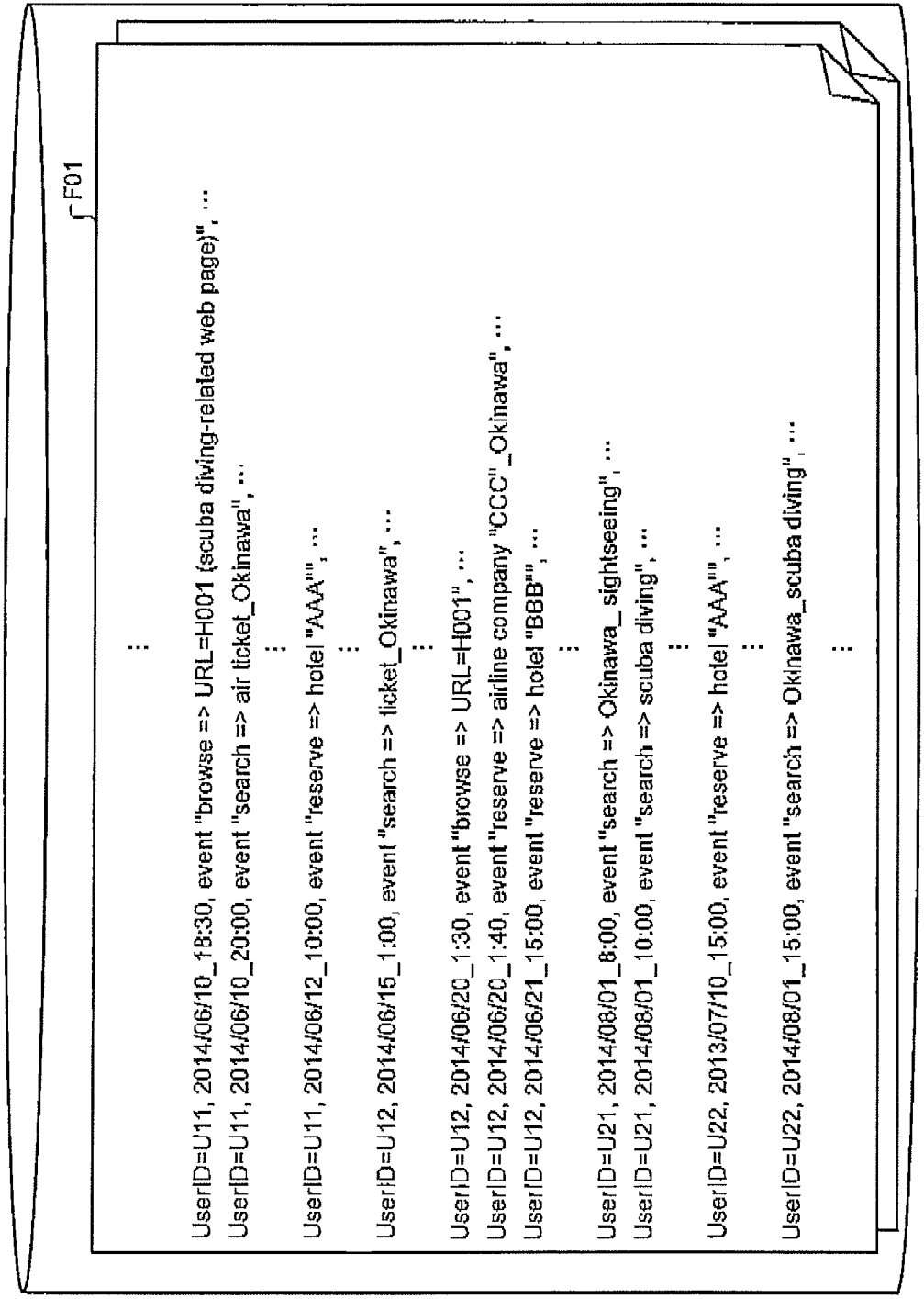
FIG. 3 is a diagram illustrating an example of a behavior information storage unit according to an embodiment.

Here, FIG. 3 illustrates an example of the behavior information storage unit 122 according to an embodiment is illustrated. FIG. 3 is a diagram illustrating the example of the behavior information storage unit 122 according to an embodiment. In an example illustrated in FIG. 3, the behavior information storage unit 122 stores a user behavior file F01 including a group of log information including items such as a "user ID", "date and time of behavior generation", or the "contents of behavior". The user behavior file F01 conceptually represents the user information acquired by the extraction device 100. In the example of FIG. 3, the log constituting the user behavior file F01 is described for each user ID, but the log is actually added in real time in order of date and time of behavior generation.

The "user ID" is identification information for identifying the user terminal 10. In FIG. 3, the user ID is expressed as "User ID=U11". This represents that the user terminal 10 is identified by the user ID "U11". Here, it is assumed that the user ID coincides with a reference sign indicating the user operating the user terminal 10. That is, the log having a description of the "User ID=U11" indicates information about an action performed by the user terminal 10 which is operated by the user U11.

In FIG. 3, the "date and time of behavior generation" is represented by a numerical value, e.g., "2014/06/10_18:30". Further, the "contents of behavior" represents contents of an action performed by the user terminal 10. For example, when the user terminal 10 performs searching, the action and the content of the action are described in a log, e.g., "event "browse=>URL=H001"". In the example of FIG. 3, it is assumed that "URL=H001" indicates a web page designated by a uniform resource locator (URL) "H001", and the web page relates to scuba diving.

That is, in FIG. 3, the example of the log constituting the user behavior file F01 represents that "at 18:30, Jun. 10, 2014", the user U11 having the user ID "U11" accesses the web page indicated by the URL "H001", and browses the web page.

Although illustration is omitted in FIG. 3, a device ID or the like as information for identifying the user terminal 10 itself may be stored in the behavior information storage unit 122. The device ID indicates identification information recorded in the terminal device itself, unlike the user ID.

Further, the behavior information storage unit 122 may be a predetermined log storage server located outside the extraction device 100, for example externally connected. In this configuration, an acquisition unit 133 described below can acquire a log stored in the predetermined log storage server through the network N. In order to acquire the user information at any time, the extraction device 100 requires a large storage capacity for storing data relating to the user information. Here, the extraction device 100 can use the log storage server externally connected corresponding to the behavior information storage unit 122 to meet the requirement for storage capacity.

(About Attribute Information Storage Unit 123)

Next, in FIG. 4, an example of the attribute information storage unit 123 according to an embodiment is illustrated. FIG. 4 is a diagram illustrating the example of the attribute information storage unit 123 according to an embodiment. In the example illustrated in FIG. 4, the attribute information storage unit 123 has items such as a "user ID" and "attribute information".

The "user ID" is identification information for identifying a user. The user ID used in the attribute information storage unit 123 has commonality with the user ID used in the behavior information storage unit 122. That is, the identification information such as the user ID "U11" indicates the same user U11, in the behavior information storage unit 122 and the attribute information storage unit 123.

The "attribute information" represents the attribute information of the user. In the example of FIG. 4, the "attribute information" is categorized into types such as "gender", "address", and "age". As described above, the "attribute information" of the attribute information storage unit 123 stores demographic attributes representing user demographic attribute information. It should be understood that the attribute information illustrated in FIG. 4 is an example, and the attribute information storage unit 123 may store psychographic attributes representing user's preferences, values, life style, personality, and the like. Further, although illustration is omitted, the attribute information storage unit 123 may store user's annual income, location, occupation, family structure, favorite genre, or the like.

For example, in the example of FIG. 4, the user U11 identified by the user ID "U11" indicates that the gender is "male", the address is "Tokyo", and the age is "30's".

(About Control Unit 130)

The control unit 130 is achieved by performing various programs (corresponding to an example of an extraction program) stored in a storage device in the extraction device 100, using a RAM as a working area, by for example a central processing unit (CPU) or a micro processing unit (MPU). Further, the control unit 130 includes for example an integrated circuit such as an application specific integrated circuit (ASIC) or a field programmable gate array (FPGA).

As illustrated in FIG. 2, the control unit 130 includes a providing unit 131, a receiving unit 132, the acquisition unit 133, a generation unit 134, an extraction unit 135, and functionally or operationally achieves or performs information processing described below. It is noted that an inner configuration of the control unit 130 is not limited to the configuration illustrated in FIG. 2, and another configuration may be employed as far as performing the information processing described below. Further, a connection relationship between the processing units of the control unit 130 is not limited to a connection relationship illustrated in FIG. 2, and another connection relationship may be employed.

(About Providing Unit 131)

The providing unit 131 provides information to the advertiser. Specifically, the providing unit 131 according to an embodiment provides a predetermined user interface for exchange of information to the advertiser CL1 using the extraction device 100. For example, the providing unit 131 provides a user interface for receiving the designation of a behavior history from the advertiser, as the explanatory behavior accounting for expectation of the specified behavior of the user.

Further, the providing unit 131 provides a user interface for receiving the designation of a plurality of behavior histories from the advertiser. That is, the advertiser can designate a plurality of items of explanatory behavior accounting for the specified behavior.

Further, the providing unit 131 provides a result of the extraction process to the advertiser CL1 by displaying an extracted result by the extraction unit 135 described below on the user interface. Further, the extraction unit 135 may generate a predetermined evaluation report based on an extraction result. In this situation, the extraction unit 135 returns the generated evaluation report to the providing unit 131. Then, the providing unit 131 provides the evaluation report generated by the extraction unit 135 to the advertiser terminal 20.

(About Receiving Unit 132)

The receiving unit 132 receives criteria relating to the extraction process. Specifically, the receiving unit 132 according to an embodiment receives the specific behavior or a designated behavior of the user from the advertiser CL1 through the user interface provided by the providing unit 131.

Figure 5:
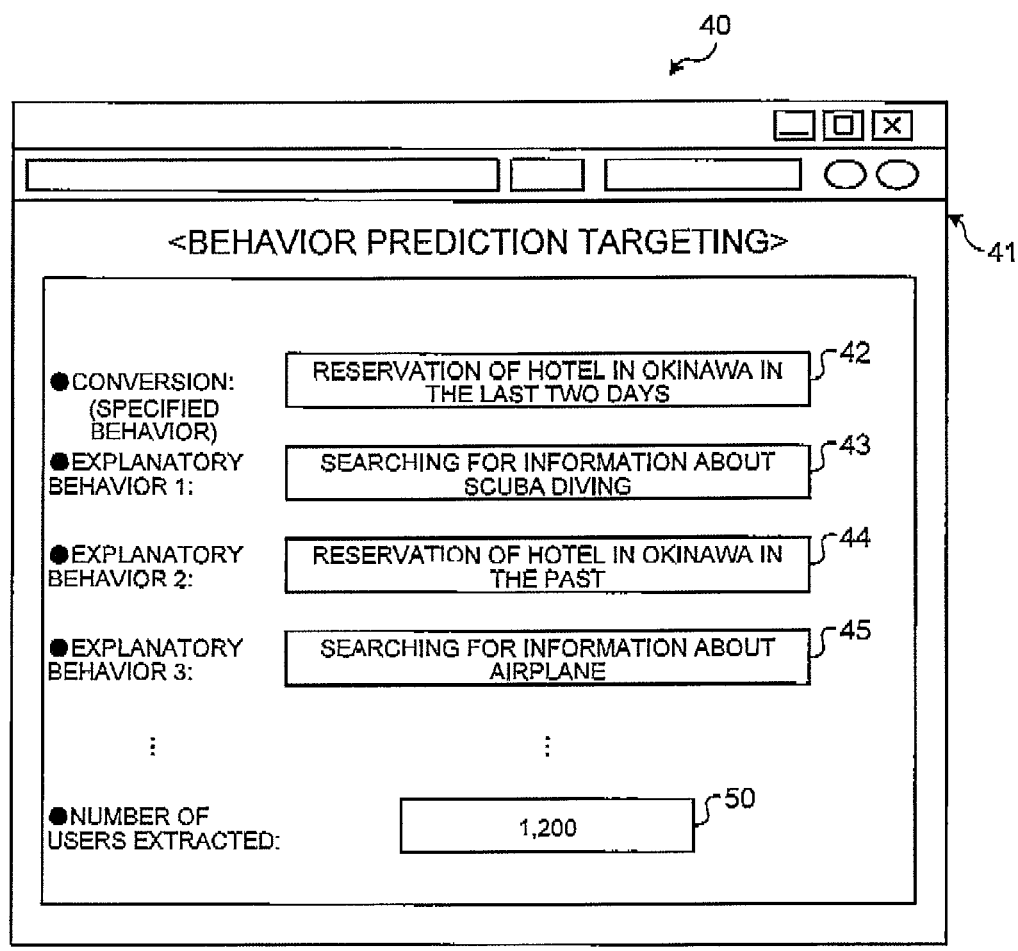
FIG. 5 is a diagram illustrating an example of a user interface according to an embodiment.

Here, using FIG. 5, the user interface provided by the providing unit 131 will be described. FIG. 5 is a diagram illustrating an example of a user interface 40 according to an embodiment. In FIG. 5, a display screen 41 embodying the user interface 40 provided by the providing unit 131 is illustrated.

As illustrated in FIG. 5, the user interface 40 includes the display screen 41 displayed on predetermined browser software. The display screen 41 includes text boxes 42, 43, 44, 45, and 50. The user interface 40 receives input from the advertiser terminal 20, in the text boxes 42, 43, 44, and 45. Further, the user interface 40 displays output received from the extraction unit 135, in the text box 50.

For example, the advertiser CL1 inputs the contents of desired conversion into the text box 42. In the example illustrated in FIG. 5, the advertiser CL1 inputs the action of "reserving a hotel in Okinawa in the last two days".

The advertiser CL1 inputs, based on the knowledge of him-/her-self, the items of behavior accounting for the contents of the conversion input into the text box 42, into the text boxes 43, 44, and 45. As illustrated in FIG. 5, for example, the advertiser CL1 inputs the user's action such as "searching for information about scuba diving", into the text box 43. As described above, the advertiser CL1 can input the user's action based on the knowledge of him-/her-self to add users hard to be automatically extracted from among whole data of the behavior histories of the users, to the users to be extracted. That is, according to the user interface 40, the number of users to whom an advertisement is to be distributed can be increased based on the knowledge of the advertiser. Further, the advertiser CL1 can define each action of the user to input the "explanatory behavior". Therefore, according to the user interface 40, the advertiser can readily perform tuning of criteria or the like of the users to be extracted. It is noted that, in the example of FIG. 5, entry fields for the explanatory behavior are represented as three text boxes 43, 44, and 45. However, the number of items of "explanatory behavior" designated by the advertiser CL1 is not limited to the number of "explanatory behavior" illustrated in FIG. 5, and may be larger or smaller than the number of items of "explanatory behavior" illustrated in FIG. 5.

Then, the receiving unit 132 transmits information received through the user interface 40, to the acquisition unit 133 and the generation unit 134 described below. The acquisition unit 133 acquires the behavior histories of the users performing specified behavior, which is received by the receiving unit 132. The generation unit 134 generates the model for extracting users based on the information transmitted from the receiving unit 132.

(About Acquisition Unit 133)

The acquisition unit 133 acquires the user information. Specifically, the acquisition unit 133 according to an embodiment acquires the behavior histories of the users being candidates to whom advertising content is to be distributed. That is, the acquisition unit 133 acquires, as the behavior history of the user, the histories of the specific behavior and the explanation behavior received from the advertiser CL1. It is noted that the acquisition unit 133 acquires not only the specific behavior and the explanation behavior, but also various behavior histories used by the generation unit 134 to generate the behavior model for the user, as described below. For example, the acquisition unit 133 acquires the behavior histories (such as access to a web page, searching behavior performed by inputting a query, or purchase behavior in a shopping page) performed from the user terminal 10.

Further, the acquisition unit 133 acquires the attribute information of the user. Then, the acquisition unit 133 stores the acquired user information in the behavior information storage unit 122 or the attribute information storage unit 123 of the user information storage unit 121.

(About Generation Unit 134)

The generation unit 134 generates a model for determining the degree of similarity between the users performing specified behavior and the target users expected to perform specified behavior based on the behavior histories designated by the advertiser. Specifically, the generation unit 134 (according to an embodiment) generates the model for determining the degree of similarity based on the behavior histories for a predetermined period before the specified behavior (selected from the behavior histories of the users performing specified behavior), the attribute information of the users performing specified behavior, and the designated behavior received by the receiving unit 132.

A process for generating the model according to an embodiment will be described below in detail, using information illustrated in FIGS. 3, 4, and 5. Here, as illustrated in FIG. 5, an example will be described in which the generation unit 134 generates the model for extracting the users expected to perform specified behavior of "reserving a hotel in Okinawa in the last two days" as the specified behavior input by the advertiser CL1, received by the receiving unit 132.

In FIG. 3, both of the user U11 and a user U12 are the users performing specified behavior of "reserving a hotel in Okinawa". For example, the user U11 is a user who reserved a hotel "AAA" in Okinawa at "10:00, Jun. 12, 2014". Further, the user U12 is a user who reserved a hotel "BBB" in Okinawa at "15:00, Jun. 21, 2014".

On the other hand, in FIG. 3, it is assumed that a user U21 and a user U22 are users not having the specified behavior at the present time. In this case, the generation unit 134 generates the model for determining the degree of similarity between the users U11 and U12 having the specified behavior, and the target users U21 and U22 expected to perform specified behavior. That is, the generation unit 134 generates the model by reference to the behavior history of each user.

In the example of FIG. 3, as the behavior history included in a predetermined period before the specified behavior of "reserving a hotel" (in this example, in the last two days before the specified behavior), the user U11 has the behavior history of ""browse=>URL=H001"", and ""search=>air ticket_Okinawa"". Here, ""search=>air ticket_Okinawa"" represents that the user U11 operates the user terminal 10 to perform searching by inputting a search query "air ticket_Okinawa" in a search service.

Further, as the behavior history in the last two days before the specified behavior of "reserving a hotel", the user U12 has the behavior history of ""browse=>URL=H001"" and ""book=>airline company "CCC"_Okinawa"". Here, ""book=>airline company "CCC"_Okinawa"" represents that the user U11 operates the user terminal 10 to book an air ticket of an airline company "CCC" to Okinawa in a booking service.

In this case, in the assumption method, when the model is generated based on the behavior histories of the users U11 and U12, the model determines that a user having a behavior history, such as ""browse=>URL=H001"", ""search=>air ticket_Okinawa"", or ""book=>airline company "CCC"_Okinawa"" in the last two days before generation of the model has a high degree of similarity with the users U11 and U12. It is noted that, in generation of such a model, the attribute information of each user as illustrated in FIG. 4 may be used. In this configuration, for example, the model may be generated to determine that the user having an attribute similar to those of the users U11 and U12 has a high degree of similarity.

On the other hand, the generation unit 134 generates a model to which an element is added based on the "explanation behavior" designated based on the knowledge of the advertiser CL1, in addition to the behavior histories of the users U11 and U12. For example, as illustrated in FIG. 5, the generation unit 134 also uses, for generation of the model, the explanation behavior designated by the advertiser CL1, such as "searching for information about scuba diving", "reserving a hotel in Okinawa in the past", or "searching for information about airplane".

That is, in the model generated by the generation unit 134, in addition to the generation of the model according to the assumption method, the explanation behavior designated by the advertiser CL1 is included in the index for determining the degree of similarity between users. For example, in the examples of the behavior histories of the users U11 and U12, the action of "searching for information about scuba diving", "reservation of a hotel in Okinawa in the past", or the like is not included. Therefore, in the assumption method, even if the behavior histories of the users U21 and U22 to be extracted include "searching for information about scuba diving", "reservation of a hotel in Okinawa in the past", or the like, influence of such behavior histories to the determination of the degree of similarity may be set relatively small.

Here, it is assumed that, based on the knowledge of the advertiser CL1, a user performing explanation behavior is known to have a possibility of performing the specified behavior in the future. Therefore, the generation unit 134 also incorporates the explanation behavior to the index for determination of the degree of similarity, and then generates a model. In this situation, compared to the assumption method, the users U21 and U22 having the behavior histories of the explanation behavior may be determined to further similar to the "user expected to perform specified behavior", in the model generated by the generation unit 134. Specifically, based on the behavior history of the user U21 such as ""search=>scuba diving,"" or the behavior history of the user U22 such as ""reserve=>hotel "AAA""" on "2013/07/10_15:00" (such a behavior history corresponds to the explanation behavior, such as "reservation of a hotel in Okinawa in the past"), or ""search=>Okinawa_scuba diving"", the generation unit 134 generates the model for determining that the degree of similarity between the users U21 and U22 and the model for the user expected to perform specified behavior is increased, compared to users not having such a behavior history.

That is, the generation unit 134 can reflect, in the generation of the model, even predetermined behavior histories of users having a small percentage of the total number of samples used for the generation of the model, and hard to be used as the index for determining the degree of similarity, by receiving the designation of the predetermined behavior histories as "explanation behavior" from the advertiser. Therefore, the generation unit 134 can take in the knowledge of the advertiser, and can generate the model for accurately determining the degree of similarity between users.

It is noted that the user behavior information and the attribute information may be acquired at different times by the acquisition unit 133. In this situation, the generation unit 134 associates the user's action and his/her attributes with each other based on the user ID, and each piece of information can be used for generation of the model.

Further, as illustrated in FIG. 5, the receiving unit 132 can receive not designation of one item of explanation behavior but designation of a plurality of items of explanation behavior from the advertiser. Therefore, the generation unit 134 can generate the model, based on a combination of a plurality of items of explanation behavior, which are designated by and received from the advertiser. Therefore, the generation unit 134 can meet detailed requests from the advertiser. Further, the generation unit 134 can acquire information being a large number of indexes for determination of the degree of similarity, so that the generation unit 134 can generate the model for accurately determining the degree of similarity.

(About Extraction Unit 135)

The extraction unit 135 extracts the target users expected to perform specified behavior, based on the behavior history designated by the advertiser, selected from the behavior histories of the users acquired by the acquisition unit 133. Specifically, the extraction unit 135 according to an embodiment uses the model generated by the generation unit 134 to extract the target users expected to perform specified behavior.

For example, the extraction unit 135 extracts users based on the degree of similarity derived by comparing the model generated by the generation unit 134 with the users to be extracted. For example, the extraction unit 135 scores the users to be extracted based on the degree of similarity expressed by a numerical value. Then, the extraction unit 135 extracts users scored equal to or above a predetermined threshold.

In the extraction process, the extraction unit 135 may express the degree of similarity between users in a form other than the score. For example, the extraction unit 135 may express the distribution of the users to be extracted in a two-dimensional coordinate space, and define a line representing the predetermined threshold to extract similar users. In this configuration, an axis in the two-dimensional coordinate space may represent, for example, the relevance to the explanation behavior designated by the advertiser, or the relevance to the past behavior history of the user. For example, the user having a higher relevance to the explanation behavior has a larger numerical value on the axis, and such a user is put to a position farther from the origin. Further, the extraction unit 135 may express the line representing the predetermined threshold by using the explanation behavior designated by the advertiser. Further, the extraction unit 135 may express the line representing the predetermined threshold by using the number of items of advertising content to be distributed designated by the advertiser. For example, the extraction unit 135 sets the line representing the predetermined threshold in the two-dimensional coordinate space to a position at which the number of users is extracted corresponding to the number of items of advertising content to be distributed designated by the advertiser. In this configuration, users distributed in one of the areas divided by the line representing the predetermined threshold are extracted as users expected to perform specified behavior and similar to the model, and users distributed in the other of the areas are not extracted.

Then the extraction unit 135 returns a result of the extraction process to the providing unit 131. Specifically, the extraction unit 135 reports to the providing unit 131 the number of users determined to be similar to the model generated by the generation unit 134. The providing unit 131 displays the number of users reported by the extraction unit 135 in the text box 50 of the user interface 40 to provide the extraction result to the advertiser CL1.

Further, the extraction unit 135 generates the predetermined evaluation report based on the extraction result. The evaluation report shows relevance between the extraction result and the explanation behavior designated by the advertiser CL1. That is, it is assumed that the designation of a predetermined explanation behavior by the advertiser CL1 increases the number of users determined to have a high degree of similarity, compared to determination in the model without the designation of the explanation behavior. In this situation, the evaluation report evaluates that such designation of the explanation behavior is appropriate.

Further, the extraction unit 135 may, for example, make a list or the like of definitions of highly-evaluated items of explanation behavior to be stored in a predetermined storage area of the storage unit 120. For example, the providing unit 131 can provide the stored items of explanation behavior to the advertiser to generate a further improved model.

3-1. Procedure of Extraction Process (1)

Figure 6:
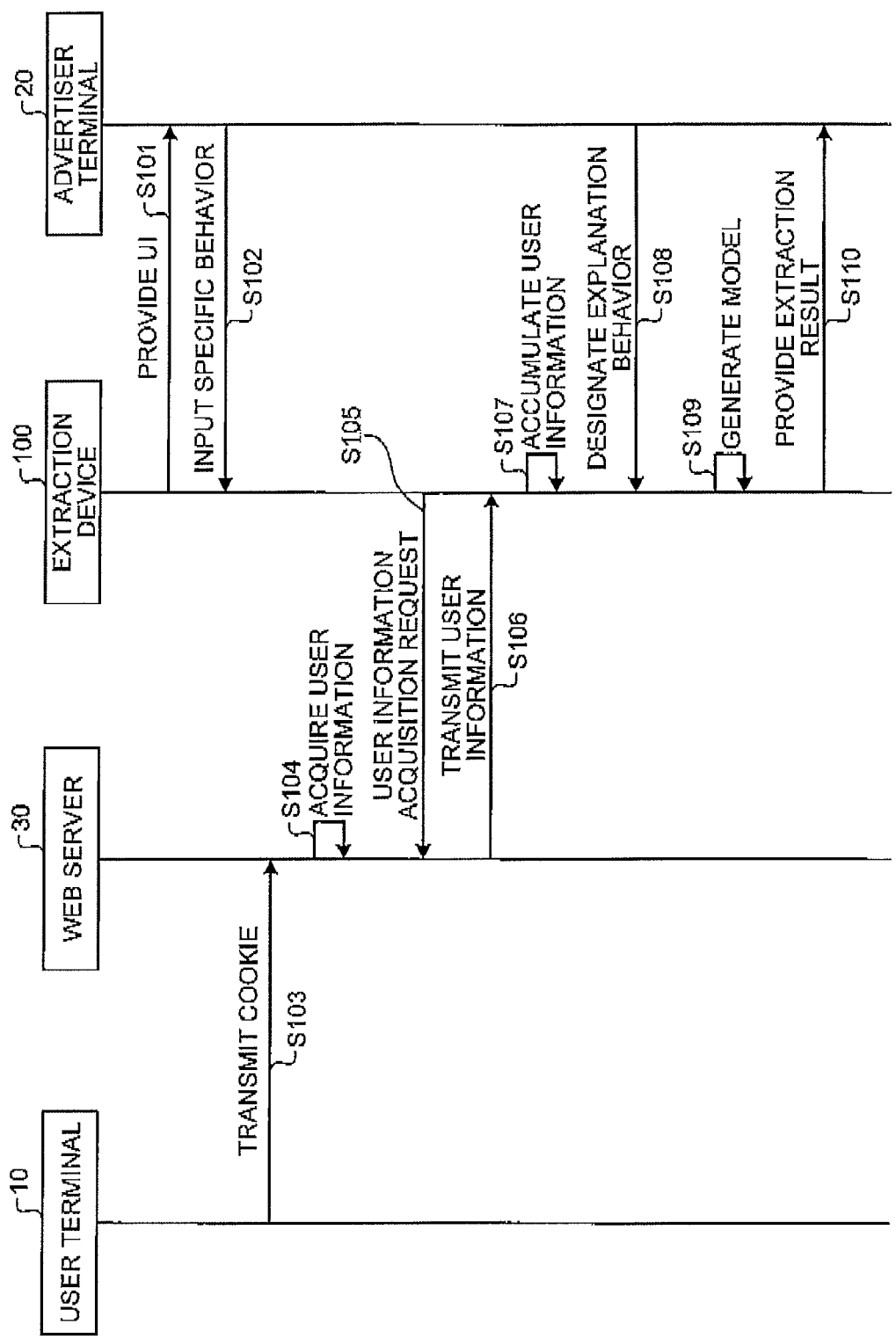
FIG. 6 is a sequence diagram illustrating a procedure of an extraction process performed by an extraction system according to an embodiment.

Next, using FIG. 6, a procedure of the extraction process by the extraction system 1 according to an embodiment will be described. FIG. 6 is a sequence diagram illustrating the procedure of the extraction process performed by the extraction system 1 according to an embodiment.

As illustrated in FIG. 6, the extraction device 100 provides a predetermined UI to the advertiser terminal 20 (step S101). The advertiser terminal 20 inputs an item of the specific behavior of a user to the UI (step S102).

On the other hand, the user terminal 10 transmits the cookie when accessing the web server 30 (step S103). The web server 30 acquires the user information of the user operating the user terminal 10, based on the cookie transmitted from the user terminal 10, (step S104).

Here, the extraction device 100 transmits a user information acquisition request including a behavior history of the specific behavior to the web server 30 (step S105). The web server 30 transmits the user information to the extraction device 100 according to the acquisition request transmitted from the extraction device 100 (step S106).

The extraction device 100 accumulates the user information transmitted from the web server 30 (step S107). Then, the extraction device 100 receives the designation of the explanation behavior from the advertiser terminal 20 (step S108).

Then, the extraction device 100 generates the model for extracting users according to the content received from the advertiser terminal 20 (step S109). Next, the extraction device 100 uses the generated model to extract users suitable for the purpose of the advertiser. The extraction device 100 provides an extraction result to the advertiser terminal 20 (step S110). This is the end of the extraction process performed by the extraction system 1.

3-2. Procedure of Extraction Process (2)

Figure 7:
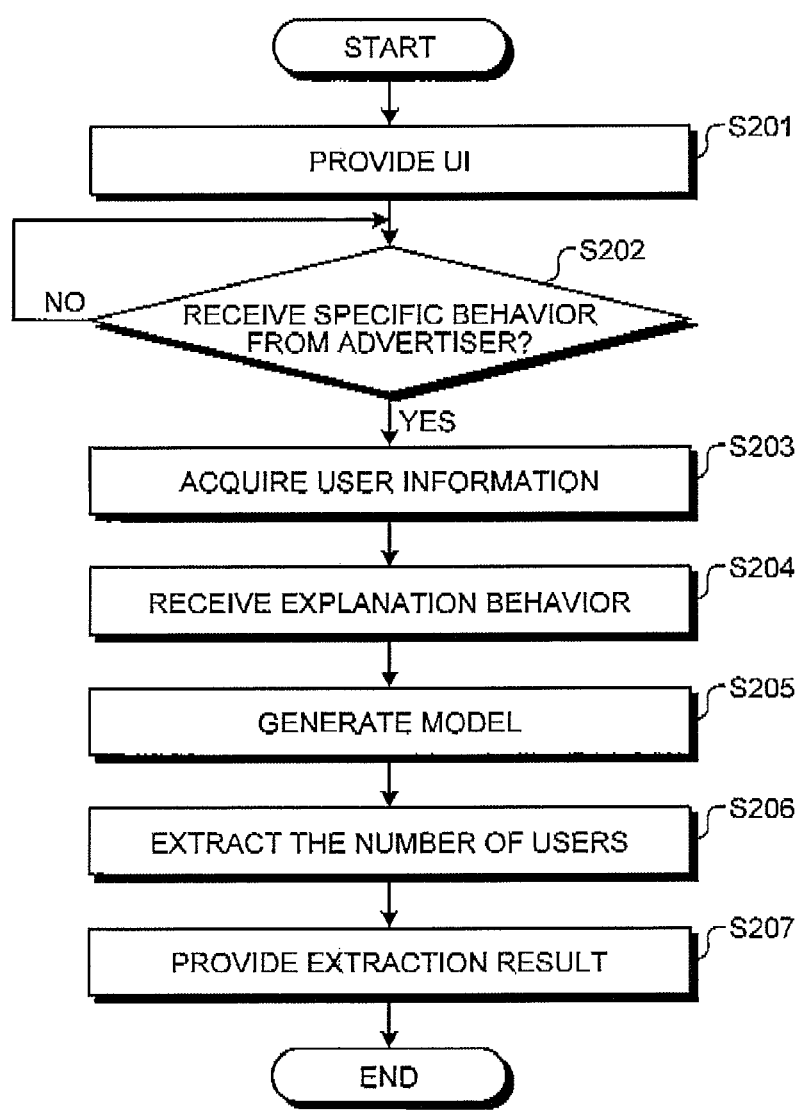
FIG. 7 is a flowchart illustrating a procedure of an extraction process performed by an extraction device according to an embodiment.

Next, using FIG. 7, a procedure of the extraction process performed by the extraction device 100 according to an embodiment will be described. FIG. 7 is a flowchart illustrating the procedure of the extraction process performed by the extraction device 100 according to an embodiment.

As illustrated in FIG. 7, the providing unit 131 provides the UI to the advertiser terminal 20 (step S201). The receiving unit 132 determines whether input of the specific behavior is received from the advertiser though the UI (step S202). When the input of the specific behavior from the advertiser is not received (step S202; No), the receiving unit 132 waits for the input of the specific behavior.

On the other hand, when the input of the specific behavior is received from the advertiser (step S202; Yes), the receiving unit 132 transmits the user information acquisition request including the specific behavior to the web server 30, and acquires the user information (step S203).

Next, the receiving unit 132 receives the designation of the explanation behavior from the advertiser (step S204). Then, the generation unit 134 generates the model for extracting users based on the content received by the receiving unit 132, and the user information being held (step S205). The extraction unit 135 uses the model generated by the generation unit 134 to perform the extraction of the users expected to perform specified behavior. Therefore, the extraction unit 135 extracts the number of users (step S206). The providing unit provides an extraction result to the advertiser through the UI (step S207). This is the end of the extraction process performed by the extraction device 100.

3-3. Business Process

Next, an example of a business process of the advertiser CL1 using the extraction device 100 according to an embodiment will be described. Here, the advertiser CL1 performs the business process described below, through the UI displayed on the advertiser terminal 20.

First, the advertiser CL1 inputs, on the UI, a "specified behavior" expected, in the future, from the users being candidates to whom advertising content is to be distributed. In the example of FIG. 5, the advertiser CL1 inputs a text "reservation of a hotel in Okinawa in the last two days" in the text box 42, to input the specified behavior. It is noted that the advertiser CL1 can also input an action of browsing a predetermined web page or an action of purchase in a predetermined shopping site as the specified behavior.

The advertiser CL1 waits for accumulation of information sets about the specified behavior by the extraction device 100. For example, the advertiser CL1 waits for accumulation of sufficient behavior histories to generate the model by the extraction device 100, for a predetermined period (e.g., for several days or several months).

Next, the advertiser CL1 designates, on the UI, the "explanatory behavior" being a motivation to predict the specified behavior. In the example of FIG. 5, the advertiser CL1 inputs a text "searching for information about scuba diving" into the text box 43 to designate the explanatory behavior. It is noted that the advertiser CL1 may further designate items of the explanatory behavior in the text boxes 44 and 45.

The advertiser CL1 receives the provided information about users extracted by the extraction device 100 based on the designated explanatory behavior. Specifically, the advertiser CL1 receives the report about the number of users displayed in the text box 50 on the UI.

Further, the advertiser CL1 can browse the evaluation report generated by the extraction device 100. The advertiser CL1 can recognize the evaluation showing whether the explanation behavior designated by him-/her-self is appropriately designated, based on the evaluation report. For example, the evaluation report includes reliability evaluation that is a score showing repeatability of an evaluation result, or accuracy evaluation showing an accuracy of the behavior prediction. For example, when the prediction accuracy is evaluated to be bad, the advertiser CL1 can examine the designated explanatory behavior to designate a different action.

The advertiser CL1 makes the advertisement distribution request to the predetermined advertisement distribution server, based on the provided result. Specifically, the advertiser CL1 causes the predetermined advertisement distribution server to distribute the advertising content to the users extracted by the extraction device 100, that is, the users expected to perform specified behavior in the future. Therefore, the advertiser CL1 can increase the effectiveness of the advertising content to be distributed.

4. Modifications

The above-mentioned extraction device 100 may be achieved in various different modes, in addition to the embodiment having been described above. Hereinafter, other embodiments of the extraction device 100 will be described.

4-1. Learning of Model

In the example of the above-mentioned embodiment, the acquisition unit 133 acquires the behavior histories of users, the generation unit 134 generates the user behavior prediction model based on the acquired behavior history, and the explanation behavior designated by the advertiser. Here, after the extraction process using the generated model, the extraction device 100 may perform an extraction process using a model that learns an extraction result.

In this configuration, after the target users are extracted by the extraction unit 135, the acquisition unit 133 acquires behavior histories of the target users. The generation unit 134 determines whether the specified behavior is included in the behavior histories of the target users after extraction, acquired by the acquisition unit 133, to evaluate the explanation behavior designated by the advertiser, and generates a learned model based on an evaluation result.

That is, the extraction unit 135 performs the extraction process, so that the users expected to perform specified behavior are extracted. Then, the acquisition unit 133 acquires the behavior histories of the extracted users after the extraction. Therefore, it can be determined whether the extracted users actually have the specified behavior after the extraction.

When the extracted users actually have the specified behavior, the generation unit 134 evaluates that the explanation behavior for the model extracting the users having been extracted is appropriately designated. For example, when behavior histories of the target users after extraction, which is acquired by the acquisition unit 133, includes the specified behavior, the generation unit 134 generates a model by weighting explanation behavior for the model used for extraction of the target users, relative to the explanation behavior for the model used for extraction of the users not having the specified behavior in the behavior histories after extraction.

In this case, the generation unit 134 may evaluate the explanation behavior upon generation of the models, or may weight predetermined explanation behavior, based on the evaluation report generated by the extraction unit 135.

As described above, the extraction device 100 evaluates the explanation behavior used for the extraction process, and reflects the evaluation in generation of the model to increase the accuracy of the extraction process in a stepwise manner.

Further, in the example of the above-mentioned embodiment, the generation unit 134 generates the model using the behavior histories for a period before the specific behavior designated by and received from the advertiser. However, the predetermined period is not limited to the period indicated in the specific behavior received from the advertiser. For example, even if the specific behavior of "reserving a hotel in Okinawa in the last two days" is received from the advertiser, the generation unit 134 may generate a model using behavior histories of users for a different period. In this situation, the generation unit 134 may generate a model setting an arbitrary period, by learning a suitable predetermined period based on an extraction result.

4-2. Acquisition of User Information

In the example of the extraction process according to the above-mentioned embodiment, the acquisition unit 133 acquires the user information when the user terminal 10 accesses the website provided by the web server 30. However, the acquisition unit 133 may acquire the user information from the user terminal 10, not only when the user terminal 10 accesses the website provided by the web server 30. A description will be made below on this point.

For example, a user information-related report function achieved by a web beacon or the like may be embedded in a predetermined website provided by the web server 30. For example, the web beacon functions to cause an information terminal used by a user accessing a web page access a transparent or very small image stored in the extraction device 100 (may be referred to as "clear GIF"). The extraction device 100 receives and acquires the user information from the user terminal 10 used by the user.

As described above, the acquisition unit 133 according to an embodiment acquires the user information from the user terminal 10, using the report function such as a web beacon embedded in the website provided by the web server 30. On the other hand, when the user terminal 10 accesses a website without the report function as described above, the acquisition unit 133 cannot acquire the user information.

However, when the user terminal 10 accesses a website provided from a predetermined web server managed by a management apparatus the same as a management apparatus (e.g., front-end server to the extraction device 100) managing the extraction device 100, the acquisition unit 133 can obtain the user information from the user terminal 10. That is, when accessing the website provided by the predetermined web server managed by the management apparatus, the user terminal 10 transmits the user information of the user terminal 10 to the management apparatus. Transmission of the user information is achieved by for example transmission of the cookie by the user terminal 10 to the management apparatus. In this situation, the user information transmitted by the user terminal 10 is transmitted to the acquisition unit 133 of the extraction device 100 through the management apparatus. Therefore, the acquisition unit 133 can acquire the user information of the user terminal 10 without going through the web server 30.

It is noted that when the user terminal 10 corresponding to the user information accumulated without through the web server 30 accesses the web server 30, the acquisition unit 133 acquires the user information including the user ID "U1" the same as the user ID "U1" included in the user information accumulated without going through the web server 30. That is, even if the user information acquired through the web server 30, or even if the user information acquired without going through the web server 30, the acquisition unit 133 can acquire the same user IDs "U1" of the user identification information according to the user terminal 10. The acquisition of the user information is achieved by transmission of the cookie corresponding to the web server 30 and the management apparatus by the user terminal 10, the user terminal 10 accessing the website using the same browser. Alternatively, the acquisition of the user information is achieved by checking the device ID of the user terminal 10.

4-3. Configuration of Apparatus

In the example of the extraction process according to the above-mentioned embodiment, the providing unit 131 provides the result of the extraction process to the advertiser. In the example, the advertiser makes a request to the predetermined advertisement distribution server for distribution of the advertising content based on the provided extraction result. However, the extraction device 100 may be an advertising apparatus further including a distribution unit and an advertising content storage unit, and configured to distribute an advertisement to the extracted users.

In this configuration, the advertising apparatus corresponding to the extraction device 100 includes a submission reception unit, an advertising content storage unit, and a distribution unit. The submission reception unit receives submission of advertising content from the advertiser terminal 20. The advertising content storage unit stores the advertising content received by the submission reception unit. The distribution unit distributes the advertising content to the extracted users responding to an advertising content distribution request from the advertiser.

It is noted that data itself of the advertising content actually distributed need not be stored in the advertising content storage unit of the advertising apparatus. For example, the distribution unit may distribute the advertising content to the user terminal 10 by transmitting an advertisement distribution control instruction to a predetermined storage server externally provided.

4-4. Criteria Received from Advertiser

In the example of the above-mentioned embodiment, the receiving unit 132 receives, on the UI, the input of the specific behavior or the explanation behavior from the advertiser. Specifically, in the example of FIG. 5, the receiving unit 132 receives the text input in the text box by the advertiser.

However, the receiving unit 132 may receive the input of the specific behavior or the explanation behavior from the advertiser in a different manner. For example, the information to be input by the advertiser may be selected from a pull-down menu by the advertiser. Further, as described above, when there is a result of the evaluation report about the explanation behavior, the information to be input by the advertiser may be selected by the advertiser from the items of explanation behavior designated in the past.

4-5. Report

In the example of the above-mentioned embodiment, the evaluation report shows the evaluation result representing whether the advertiser appropriately designates the explanation behavior. Here, the evaluation report may include cost per acquisition (CPA) or the like of the advertising content after actual distribution of the advertisement. The CPA represents costs per new customer acquired, when the conversion (acquisition of new customer) is achieved by the advertising content. The CPA is obtained by dividing the advertisement costs by the number of conversions, and a lower value of the CPA represents efficient advertisement. Therefore, the advertiser can determine whether the number of customers is accurately increased.

Further, the extracted information about users is not limited to a mode of use for the advertisement distribution, and may be applied to other various applications. For example, information about the users extracted by the extraction device 100 may be used for activities for acquiring new users (e.g., mail delivery to the extracted users) based on a user list or the like generated by the extraction device 100.

4-6. Content

In the example of the above-mentioned embodiment, the content distributed to the users is the advertising content. Further, in the example, a content provider is the advertiser. However, the content may be content other than the advertising content. For example, the content may be a web page. When the content is the web page, the extraction device 100 receives the input of the specific behavior or the explanation behavior from a web-page provider who wants users to browse the web page. It is noted that the content provider is not limited to a provider him-/her-self of the advertising content or the web page. As described above, the content provider may be an advertisement agency, or a person in charge of the advertiser, in an advertisement distribution company being a submission destination of the advertising content. In this case, the person in charge of the advertiser, in the advertisement agency or the advertisement distribution company includes a person who knows the business activities, the business contents, or the like of the advertiser, or a person who can directly or indirectly enjoy knowledge of the business activities or the business contents of the advertiser, and has knowledge equivalent to that of the advertiser. That is, the content provider can include a person who has knowledge equivalent to that of the provider or a person who can have knowledge from the advertiser, in addition to the provider him-/her-self.

5. Hardware Configuration

Figure 8:
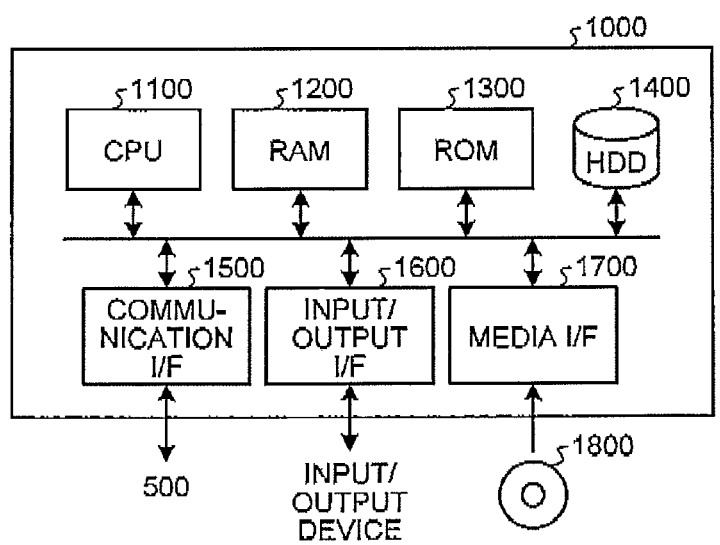
FIG. 8 is a hardware configuration diagram illustrating an example of a computer functioning as an extraction device.

Further, the extraction device 100 according to the above-mentioned embodiment includes for example a computer 1000 having a configuration as illustrated in FIG. 8. An example of the extraction device 100 will be described below. FIG. 8 is a hardware configuration diagram illustrating an example of the computer 1000 functioning as the extraction device 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 is operated based on programs stored in the ROM 1300 or the HDD 1400, and controls each of the units. The ROM 1300 stores a boot program executed by the CPU 1100 upon booting the computer 1000, programs depending on hardware of the computer 1000, and the like.

The HDD 1400 stores programs executed by the CPU 1100, data used for such programs, and the like. The communication interface 1500 receives data from another device through a communication network 500 (corresponding to the network N), and transmits the data to the CPU 1100, and further, transmits data generated by the CPU 1100 to another device through the communication network 500.

The CPU 1100 controls an output device such as a display or a printer, and an input device such as a keyboard or a mouse, through the input/output interface 1600. The CPU 1100 acquires data from the input device through the input/output interface 1600. Further, the CPU 1100 outputs the generated data to the output device through the input/output interface 1600.

The media interface 1700 reads programs or data such as the extraction program stored in a storage medium 1800 as an example of the non-transitory computer-readable storage medium, and provides the program or data to the CPU 1100 through the RAM 1200. The CPU 1100 loads such programs from the storage medium 1800 on the RAM 1200 through the media interface 1700, and executes the loaded programs. The storage medium 1800 includes for example an optical storage medium such as a digital versatile disc (DVD), or phase change rewritable disk (PD), a magnetooptical storage medium such as a magneto-optical disk (MO), a tape medium, a magnetic storage medium, or a semiconductor memory.

For example, when the computer 1000 functions as the extraction device 100 according to an embodiment, the CPU 1100 of the computer 1000 executes the programs loaded on the RAM 1200 to achieve the function of the control unit 130. Further, the HDD 1400 stores data in the storage unit 120. The CPU 1100 of the computer 1000 reads these programs from the storage medium 1800 and executes these programs, but may acquire these programs from another apparatus through the communication network 500, as another example.

6. Others

Further, in the processes having been described in the above-mentioned embodiment, all or part of the processes described to be automatically performed may also be manually performed, or all or part of the processes described to be manually performed may also be automatically performed by a known method. Additionally, the procedure in the description or the drawings, specific names, information including various data or parameters can be changed arbitrarily, unless otherwise designated. For example, various information illustrated in the figures is not limited to the information illustrated.

Further, component elements of each apparatus illustrated in the drawings represent a functional concept, and are not necessarily configured physically as illustrated in the drawings. That is, the specific mode of distribution or integration of each apparatus is not limited to the one as illustrated in the drawings. The whole or part thereof may be distributed or integrated functionally or physically in any units according to various kinds of loads, usage conditions, or the like. For example, the providing unit 131 and the receiving unit 132 illustrated in FIG. 2 may be integrated with each other. Further, for example, the generation unit 134 and the extraction unit 135 may be an integrated extraction unit. Further, for example, information stored in the storage unit 120 may be stored in a storage device externally provided, through the network N.

Further, for example, in the example of the above-mentioned embodiment, the extraction device 100 performs the processes of acquisition for acquiring the information about the users being candidates to whom advertising content is to be distributed, and extraction for extracting the target users. However, the above-mentioned extraction device 100 may be separated into an acquisition device for performing the acquisition process, and an extraction device for performing the extraction process. In this configuration, the acquisition device includes the acquisition unit 133. Further, the extraction device includes the providing unit 131, the receiving unit 132, the generation unit 134, and the extraction unit 135.

Further, the above-mentioned embodiments can be appropriately combined within a range consistent with the processing contents.

7. Effects

As described above, the extraction device 100 according to an embodiment includes the acquisition unit 133, and the extraction unit 135. The acquisition unit 133 acquires the behavior histories of the users being candidates to whom content (e.g., advertising content) to be distributed. The extraction unit 135 extracts the target users expected to perform specified behavior from the behavior histories acquired by the acquisition unit 133, based on the behavior history designated by the content provider (e.g., advertiser).

Therefore, the extraction device 100 according to an embodiment can highly accurately extract the users expected to perform specified behavior, based on the knowledge of the advertiser. According to the extraction device 100 of an embodiment, the advertiser can distribute the advertising content to the users performing, in the future, behavior suitable for the purpose of the advertiser, and thus, effectiveness of the advertising content to be distributed can be increased.

Further, the extraction device 100 according to an embodiment further includes the generation unit 134 for generating the model for determining the degree of similarity between the users performing the specified behavior and the target users expected to perform specified behavior, based on the explanation behavior as the behavior history designated by the advertiser. The extraction unit 135 uses the model generated by the generation unit 134 to extract the target users expected to perform specified behavior.

As described above, the extraction device 100 according to an embodiment extracts users expected to perform specific behavior based on the degree of similarity between users. Therefore, the extraction device 100 according to an embodiment can highly accurately extract the users to whom an advertisement is to be distributed based on accurate determination.

Further, the acquisition unit 133 acquires the behavior histories of the users performing the specified behavior. The generation unit 134 generates the model based on the behavior histories for a predetermined period before the specified behavior is performed, the attribute information of the users performing the specified behavior, and the behavior history designated by the advertiser, which are selected from the behavior histories of the users performing the specified behavior.

As described above, the extraction device 100 according to an embodiment uses the information of the user performing the specified behavior as the index for determination of the degree of similarity, and also uses the explanation behavior designated by the advertiser as the index for determination of the degree of similarity in order to generate the model. Therefore, the extraction device 100 according to an embodiment uses various information to generate the user behavior prediction model, and can highly accurately generate the model for extracting the users.

Further, the extraction device 100 according to an embodiment further includes the providing unit 131 for providing the user interface 40 for receiving the designation of a behavior history from the advertiser as the explanatory behavior accounting for expectation of the specified behavior of the user. The generation unit 134 generates the model based on the received behavior history designated by the advertiser through the user interface 40 provided by the providing unit 131.

As described above, according to the extraction device 100 of an embodiment, the advertiser can perform exchange of information with the extraction device 100 through the user interface 40. Therefore, the advertiser can readily perform input about a user's action to be designated, or the like, based on the knowledge of him-/her-self. That is, the extraction device 100 provides the user interface 40 to provide an environment readily recognized and convenient for the advertiser, and efficiently perform the user extraction process.

Further, the providing unit 131 provides the user interface 40 for receiving the designation of a plurality of behavior histories from the advertiser. The generation unit 134 generates the model based on a combination of the plurality of received behavior histories designated by the advertiser.

Therefore, the extraction device 100 according to an embodiment can extract the users to whom advertisement is to be distributed according to the detail request from the advertiser.

Further, after the extraction unit 135 extracts the target users, the acquisition unit 133 acquires the behavior histories of the target users after extraction. The generation unit 134 determines whether the specified behavior is included in the behavior histories of the target users after extraction, acquired by the acquisition unit 133, to evaluate the behavior history designated by the advertiser, and generates the learned model based on the evaluation result.

Specifically, when the specified behavior is included in the behavior histories of the target users after extraction, acquired by the acquisition unit 133, the generation unit 134 generates the model by weighting the explanation behavior for the model used for extraction of the target users, relative to the explanation behavior for the model used for extraction of the users not having the specified behavior in the behavior histories after extraction.

Therefore, the extraction device 100 according to an embodiment can generate the model performing a learned process according to actual conditions of the users' action. Accordingly, the extraction device 100 according to an embodiment can accurately extract the users.

The embodiments of the present application have been described in detail based on the drawings, but which are given by way of example, and the present invention can be carried out in other modes to which various modifications and improvements are applied based on the knowledge of those skilled in the art, including the modes described in "Summary of the Invention".

Further, the "section", "module", or "unit" can be replaced with "means", a "circuit", or the like. For example, the acquisition unit can be replaced with acquisition means or an acquisition circuit.

According to an aspect of an embodiment, advertising effectiveness can be increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system comprising:
a web server;
a plurality of user terminals associated with a plurality of users, the plurality of user terminals being connected to the web server via a network, each of the user terminals transmitting a cookie to the web server over the network when accessing the web server to acquire a web page, the cookie including a user identifier and a behavior history of the associated user; and
an extraction device connected via the network to the web server, the extraction device comprising:
a memory; and
a processor operatively coupled with the memory, the processor being programmed to:
acquire, over the network, the user identifiers and behavior histories of the plurality of users from the web server;
store the user identifiers and behavior histories of the plurality of users in the memory;
provide a user interface to a content provider terminal over the network, the user interface being configured to prompt a content provider to input designations of a specified behavior and an explanatory behavior;
receive, over the network from the content provider terminal, the specified behavior and the explanatory behavior designated by the content provider;
generate a model by identifying similarities between behavior histories including the specified behavior, and using an association between the explanatory behavior and the specified behavior, the model enabling prediction that one of the plurality of users will perform the specified behavior based on its behavior history;
determine, for each of the users, whether a similarity between the user's behavior history and the model is not less than a predetermined threshold; and
in response to the similarity of one or more users being not less than the predetermined threshold, extract the one or more users as the candidates predicted to perform the specified behavior and to whom content is to be distributed.

2. The system according to claim 1, wherein the processor is further programmed to:
generate the model based on: behavior histories for a predetermined period before the specified behavior is performed, attribute information of the users performing the specified behavior, and the explanatory behavior from the behavior histories of the users performing the specified behavior.

3. The system according to claim 1, wherein the processor is further programmed to:
provide the user interface configured to cause the content provider to input a designation of a plurality of behavior histories;
receive, over the network from the content provider terminal, the designated plurality of behavior histories; and
generate the model based on a combination of the plurality of received behavior histories designated by the content provider.

4. The system according to claim 1, wherein the processor is further programmed to:
acquire later behavior histories of the candidates after extraction;
determine whether the specified behavior is included in the later behavior histories to evaluate the explanatory behavior; and
generate a learned model based on an evaluation result.

5. The system according to claim 4, wherein the processor is further programmed to:
generate the learned model by weighting the explanatory behavior based on a comparison of candidates for whom the later behavior history included the specified behavior and candidates for whom the later behavior history did not include the specified behavior.

6. An extraction method performed by a system, comprising:
transmitting to a web server, over a network, a cookie from each of a plurality of user terminals associated with a plurality of users when the user terminal acquires a web page from the web server, the cookie including a user identifier and a behavior history of the associated user; and
using a computer:
acquiring, over the network, the user identifiers and behavior histories of the plurality of users from the web server;
storing the user identifiers and behavior histories of the plurality of users in a memory;
providing a user interface to a content provider terminal over the network, the user interface being configured to prompt a content provider to input designations of a specified behavior and an explanatory behavior;
receiving, over the network from the content provider terminal, the specified behavior and the explanatory behavior designated by the content provider;
generating a model by identifying similarities between behavior histories including the specified behavior, and using an association between the explanatory behavior and the specified behavior, the model enabling prediction that one of the plurality of users will perform the specified behavior based on its behavior history;
determining, for each of the users, whether a similarity between the user's behavior history and the model is not less than a predetermined threshold; and
in response to the similarity of one or more users being not less than the predetermined threshold, extract the one or more users as candidates predicted to perform the specified behavior and to whom content is to be distributed.

7. A system comprising:
a web server;
a plurality of user terminals of users connected to the web server via a network, each of the user terminals transmitting over the network a cookie to the web server when accessing the web server to acquire a web page, the cookie including a user identifier (ID) and a behavior history of the corresponding user; and a non-transitory computer readable storage medium having stored therein an extraction program, the extraction program causing a computer to perform:
- acquiring, over the network, user IDs and behavior histories of users from the web server;
- accumulating the acquired behavior histories of the users in a memory, based on user IDs as information for identification of the users;
- providing a user interface to a content provider terminal over the network, the user interface being configured to prompt a content provider to input designations of a specified behavior and an explanatory behavior;
- receiving, over the network from the content provider terminal, the specified behavior and the explanatory behavior designated by the content provider;
- generating a model by identifying similarities between behavior histories including the specified behavior, and using an association between the explanatory behavior and the specified behavior, the model enabling prediction that users will perform the specified behavior based on behavior history;
- determining, for each of the users, whether a similarity between the user's behavior history and the model is not less than a predetermined threshold; and
- in response to the similarity of one or more users being not less than the predetermined threshold, extract the one or more users as candidates predicted to perform the specified behavior and to whom content is to be distributed.

* * * * *